United States Patent [19]

Raff et al.

[11] Patent Number: 4,463,594

[45] Date of Patent: Aug. 7, 1984

[54] WIDE-RANGE TEMPERATURE OPERATING SYSTEM FOR COMBUSTION GAS OXYGEN SENSOR, AND METHOD

[75] Inventors: Lothar Raff, Remseck; Hans-Martin Wiedenmann, Stuttgart, both of Fed. Rep. of Germany

[73] Assignee: Robert Bosch GmbH, Stuttgart, Fed. Rep. of Germany

[21] Appl. No.: 377,604

[22] Filed: May 13, 1982

[30] Foreign Application Priority Data

Jul. 3, 1981 [DE] Fed. Rep. of Germany ....... 3126238

[51] Int. Cl.³ ......................... G01N 31/00; F02B 3/08

[52] U.S. Cl. ......................................... 73/23; 123/440

[58] Field of Search .................... 73/23; 123/440, 489; 204/406, 1 Y

[56] References Cited

U.S. PATENT DOCUMENTS

| | | | |
|---|---|---|---|
| 3,875,907 | 4/1975 | Wessel et al. | 123/440 |
| 3,948,081 | 4/1976 | Wessel et al. | 73/23 |
| 4,140,085 | 2/1979 | Rabus et al. | 123/440 |
| 4,345,562 | 8/1982 | Drews et al. | 123/440 |

OTHER PUBLICATIONS

"Automotive Handbook", pp. 275–277, 1976.

*Primary Examiner*—Stephen A. Kreitman

*Attorney, Agent, or Firm*—Frishauf, Holtz, Goodman & Woodward

[57] ABSTRACT

To compensate for temperature-dependent shift on the operating characteristics of an oxygen ion conductive sensor which tends to shift the operating characteristics towards the "lean" range ($\lambda > 1$) at low temperature, and towards the "rich" range ($\lambda < 1$) at high temperature, the pulses derived from the sensor are delayed or shifted such that the trailing edge of the pulses, representative of shift from lean to rich direction, is transmitted with delay; dependent on temperature, the shift from rich to lean is also transmitted with delay. The delays are obtained by timing circuits (9, 14) which have variable time delays, the time delay being controlled by a temperature signal (9*a*) derived by sensing a-c resistance of the sensor, split by a high-pass filter and rectified. The pulses are extended by extending the trailing edge of the pulse by a first timing stage (9) or foreshorten, thus delaying, the occurrence of the leading edge of the pulses by a second timing circuit (14), the respective pulses being logically combined in dependence on temperature determined by a comparator (18) with respect to a temperature level of, for example, 300° C.–400° C. set point.

20 Claims, 5 Drawing Figures

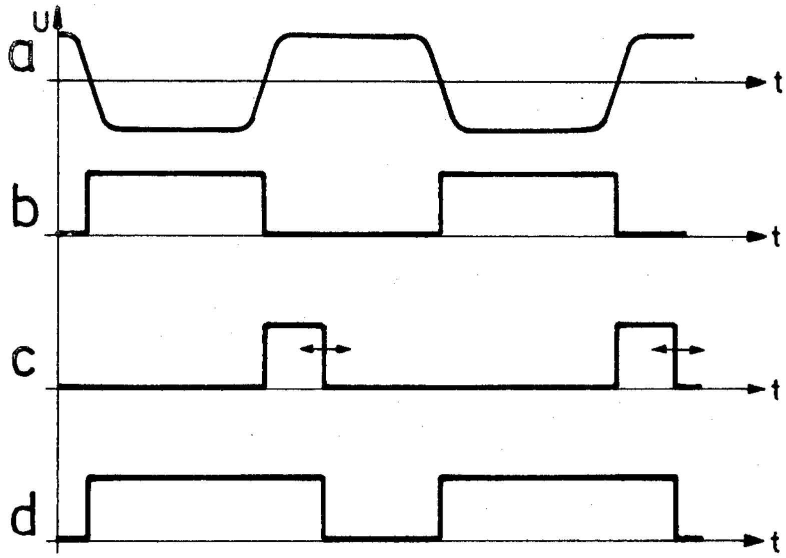
FIG. 3
FIG. 4
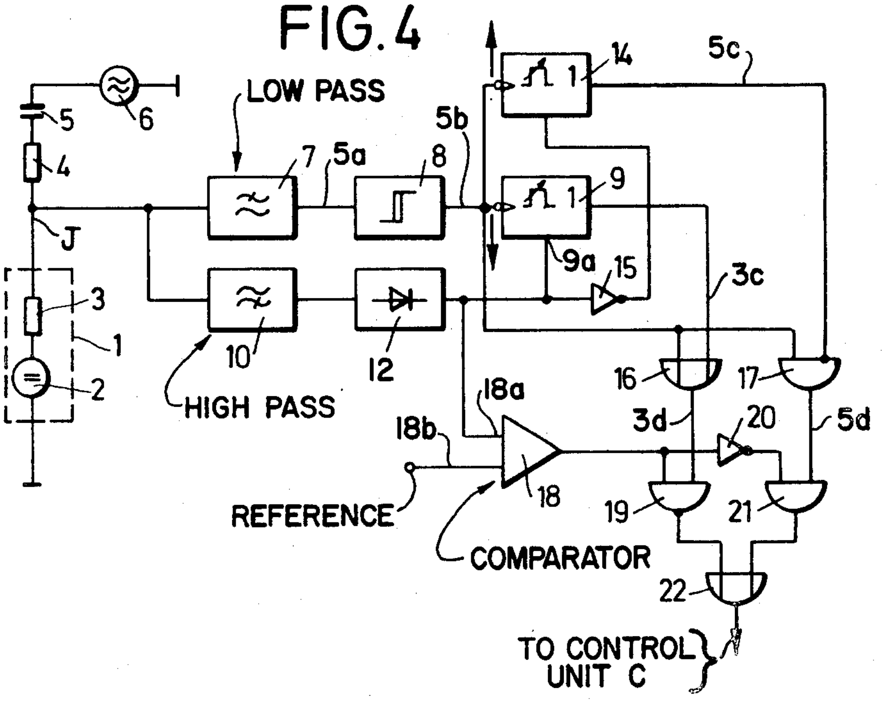

WIDE-RANGE TEMPERATURE OPERATING SYSTEM FOR COMBUSTION GAS OXYGEN SENSOR, AND METHOD

Reference to related patents and application and literature, assigned to the assignee of the present invention and incorporated herein by reference: U.S. Pat. No. 3,875,907, WESSEL et al.; German Pat. No. 24 42 229. U.S. Ser. No. 357,803, filed Mar. 12, 1982, now U.S. Pat. No. 4,419,190, Dec. 6, 1983 DIETZ et al. Related publication "Automotive Handbook", English edition, Copyright 1976 by the assignee of this application, chapter on exhaust gases, pp. 275–277.

The present invention relates to a method and system to provide output signals from an oxygen sensor, particularly of the zirconium dioxide type during wide ranges of temperature of operation of the sensor, and more particularly to such a system and method suitable for use in combination with exhaust gas analyzing systems, for example to determine the oxygen content in the exhaust gases from combustion processes, such as furnaces, heating installations, internal combustion engines, and the like.

BACKGROUND

The air-fuel mixture which is supplied to a combustion chamber, for example to the inlet manifold of an internal combustion (IC) engine, can be controlled by sensing the exhaust gases from the combustion process, and then controlling the mass ratio of fuel-air so that the output or exhaust gas will have low noxious components. Oxygen sensors can be used which provide output signals varying in value in dependence on the oxygen content in the exhaust gas, that is, whether the exhaust gas is "lean", that is, has an excess of oxygen, or "rich", that is, contains an excess of unburned hydrocarbons. Such oxygen sensors have been used in various types of control systems. On such system is described in U.S. Pat. No. 3,875,907, WESSEL et al., assigned to the assignee of this application. It has already been proposed—see German Pat. No. 24 42 229—to modify the output signal derived from an oxygen sensor by extending the output signal derived therefrom by a predetermined time duration, in accordance with a time setting. The modified output signal then permits controlling the subsequent control system to, in turn, so control the fuel-air ratio that the exhaust gases can vary between $\lambda=0.95$ to 1.05, in which $\lambda$ is defined as the "air number" and $\lambda=1.0$ refers to stoichiometric proportion of fuel and air, resulting in exhaust gases which contain neither unburned hydrocarbons nor excess oxygen. The arrangement described in the aforementioned German Pat. No. 24 42 229 does not permit operating the oxygen sensor at any desired temperature, without change of the $\lambda$-value.

U.S. patent application Ser. No. 357,803, filed Mar. 12, 1982, DIETZ et al., now U.S. Pat. No. 4,419,190, Dec. 6, 1983 assigned to the assignee of this application, describes a system in which the temperature of an oxygen sensor of the type to which the present invention relates can be determined by measuring the a-c resistance thereof. A temperature signal thus can be obtained from the sensor which can be used to heat the sensor or to connect the sensor, or a control system connected thereto, only when the sensor has reached a predetermined temperature, in order to insure that the control system will, reliably, control the fuel-air ratio to the combustion process to result in optimum combustion.

THE INVENTION

It is an object to provide a method and system to compensate for variation in response of the oxygen sensor at various temperatures by so processing the signals derived therefrom—in dependence on temperature—that temperature-caused variations in the relationship of output signal of the sensor with respect to the sensed composition of the gases are effectively eliminated, or controlled.

Briefly, an oxygen sensor of the type providing an output signal varying between two values in dependence on oxygen content of the gas to which it is exposed is connected to a threshold circuit which responds to the output level of the oxygen sensor. The threshold circuit provides discrete output signals representative of the sensed output signal of the sensor. A temperature signal is obtained, representative of the temperature of the sensor, for example by measuring the a-c resistance thereof. In accordance with the invention, at least one timing stage is connected to the threshold circuit, the timing stage having a variable time constant. The time constant of the timing stage is controlled by the temperature signal, so that the timing of the output signal will be shifted with respect to the timing of changes in the sensed signal, thus compensating for response shifts of the sensing signal with respect to temperature upon equal deviations of the gas to which the sensor is exposed from stoichiometric value, i.e. $\lambda=1.0$.

The system and method has the advantage that the sensor can be operated outside of the temperature range to which it was previously restricted, and connected to control systems without obtaining spurious response of the control system due to inadequate temperature level of the sensor. for example. The sensor, thus, can provide effective control of fuel-air ratio to an IC engine, a heating installation, furnace, or the like, and can be used for control for optimum combustion although the sensor has not yet reached its operating temperature above, for example, 600°–700° C. Thus, the sensor can be used in temperature ranges which are high, as well as those which are low, while obtaining the same control accuracy. The system also permits change of the air-fuel mixture being supplied to the IC engine, furnace or heating installation, in dependence on the then prevailing operating temperature of the sensor so that, at that operating temperature, the combustion process will occur under optimum conditions.

In accordance with a preferred form of the invention, the timing stage is so arranged that the output jump in its output signal is delayed if the gas changed from lean to rich condition, that is, the output signal from the sensor changes from a low to a high value. The timing circuit, then, delays the sensed voltage jump, and supplies it to a control system with its time delay which—as stated—will depend on the temperature of the sensor itself. This, then, permits compensation of the operating characteristics of the sensor in low-temperature ranges which, as will be described, are shifted at low temperature towards the "lean" range. In accordance with a further and preferred feature of the invention, a second variable timing stage can be used which delays the rich-to-lean signal from the sensor, that is, the jump in output signal from a high to a low value, and provides this signal with delay to a further control system. This delay of the sensor signal permits compensation for the shift of the sensor characteristics towards the "rich" region when applying the signal to a control system. An evaluation logic, then, is preferably provided which combines the modified signals and, in dependence on a predetermined temperature threshold or reference value, passes the signals modified by the first or the second timing stage, respectively. This system permits employment of the sensor in installations subject to wide temperature swings, while providing a temperature-compensated output signal at all times. The timing stages can be easily constructed in tbe form of monostable multivibrators or monostable flip-flops. The temperature of the oxygen sensor is preferably measured by measuring the resistance thereof to the passage of alternating current—see the referenced application Ser. No. 357,803, Mar. 12, 1982, DIETZ. A voltage, proportional to the a-c resistance, is derived which, preferably, is rectified to derive a d-c voltage representative of the temperature, the d-c voltage then providing the signal which is used to change the timing of the timing stages in dependence on temperature. Separation of the a-c signal proportional to temperature and the d-c signal proportional to oxygen content in the gases to which the sensor is exposed can readily be done by applying the output signal to a high-pass filter and a low-pass filter, respectively. The temperature-dependent d-c signal is obtained by including a rectifier in the channel of the a-c signal, the output from the rectifier then determining the time constants of the timing stage or stages. Thus, presently used oxygen sensors may continue to be used; it is only necessary to change the evaluation circuit by including therein a temperature-dependent control. The sensing unit itself need not be exchanged or modified.

Short evaluation time of the signal can be obtained by utilizing a comparator which tests the temperature signal with respect to a predetermined reference. If the temperature-dependent signal from the oxygen sensor exceeds the reference, a flip-flop is energized by the trailing flank of the temperature-dependent signal; if the temperature signal is below the reference, a flip-flop is triggered with the leading flank of the temperature signal. The output signal of the sensor, thus, is delayed upon change-over from lean to rich values or from rich to lean values of the gases to which the sensor is exposed, respectively. Thus, a modified output signal can be easily obtained and applied to utilization circuits which employ integrators—as well known—for logic evaluation and processing in further circuitry. The alternating current source to determine the alternating current resistance preferably is coupled over a capacitor to the oxygen sensor so that loading of the sensor element itself with respect to d-c remains low.

DRAWINGS

FIG. 3 is a pulse diagram having graphs a-d on a common time axis to illustrate the operation of the embodiment of FIG. 2;

FIG. 4 is a block diagram of a further embodiment of the invention; and

Figure 1:
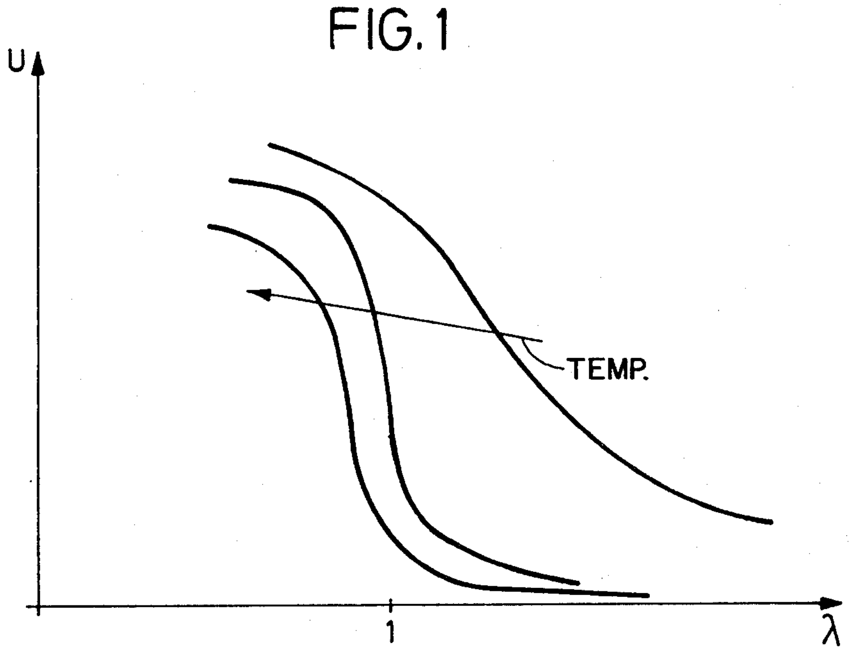
FIG. 1 illustrates a family of curves of voltage (ordinate) with respect to air number λ at different temperatures.

The output signals derived from an oxygen sensor upon change of composition of gases to which the sensor element is exposed is shown in FIG. 1, in which the output signal voltage U is shown with respect to air number λ. For a detailed explanation of the operation of such a sensor, reference is made to "Automotive Handbook", first English edition, published by the assignee of the present application, chapter on exhaust gases.

The diagram illustrates the variation in output voltage with respect to temperature and air number λ by a family of curves, with the temperature increasing in the direction of the arrow TEMP. As can be clearly seen from the family of curves, the change in output voltage or the jump in output voltage at low temperature is in a range of λ which is greater than 1 or unity. As the temperature of the sensor increases, the jump moves in the direction of a richer mixture, that is, towards λ=unity, and at very high temperatures, the jump in output voltage is in the "rich" region, that is, at a value of $\lambda<1$ or unity.

In accordance with the present invention, the temperature-dependent operation of the sensor output voltage is so compensated that the position of the characteristic curve of the output applied to a control system is always at the range of $\lambda=1$.

Figure 2:
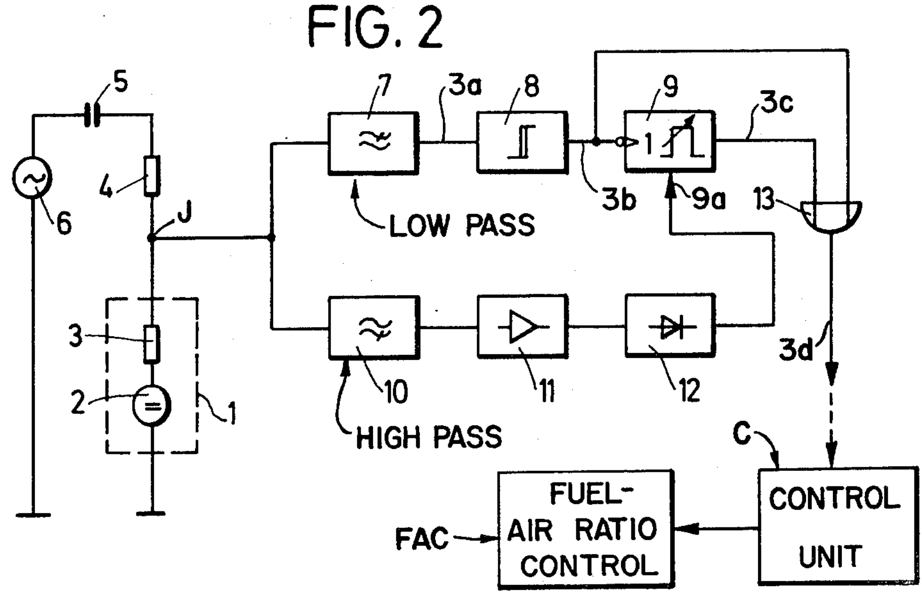
FIG. 2 is a block circuit diagram of a first embodiment of the invention.

FIG. 2 illustrates the system in which a λ sensor 1 is installed in the exhaust system from a combustion process, for example in the exhaust system of an IC engine, and exposed to the exhaust gases emanating therefrom. The engine and the exhaust gases are not illustrated. The λ sensor 1 is shown in its electrical equivalent diagram as a d-c voltage source 2 and the internal resistance 3 thereof. One terminal of the sensor 1 is connected to ground or chassis; the other terminal is connected to a junction J. Junction J is connected over a resistor 4 to a capacitor 5 which, in turn, is connected to a source of a-c 6, the other terminal of which is connected to ground or chassis to close the circuit.

Junction J is connected to two channels or branches. One of the channels or branches includes a low-pass filter 7, the output of which is connected to a Schmitt trigger 8. The Schmitt trigger 8 is connected to a voltage controlled monostable flip-flop (FF) 9. A second channel from junction J is connected to a high-pass filter 10, the output of which is amplified in an amplifier 11 and then rectified in a rectifier 12. The output of rectifier 12 is connected to the timing control input of the the monostable FF 9.

The output of the monostable FF 9 as well as the output from the Schmitt trigger 8 are connected to the inputs of an OR-gate or coupling element 13. The output of the OR-gate 13 then provides an output signal which may be utilized to control the composition of the exhaust gases by controlling the air-fuel ratio being supplied to the IC engine, the exhaust gases of which are being measured by the sensor 1, as explained, for example, in the aforementioned WESSEL U.S. Pat. No. 3,875,907.

Operation, with reference to FIG. 3: The sensor 1 provides a voltage, the voltage level of which is a measure for the oxygen content in the exhaust gas. The d-c voltage signal from the sensor 1 is applied, from junction J, to the low-pass filter 7. Low-pass filter 7, for example, has a limiting frequency of about 8–10 Hz. If the λ sensor is connected to a control system which, for example, is included in the exhaust duct of an IC engine having a fuel injection system supplying fuel thereto, the output from low-pass filter 7 will provide a signal represented by graph a of FIG. 3, and available as signal 3*a* in FIG. 2. The fuel injection system may be controlled, at least in part, in dependence on the composition of the exhaust gases. During a control cycle, the air-fuel composition will change continuously from "rich" to "lean" and reverse, and the sensor voltage will hunt about a preset voltage threshold level. This signal is converted into square-wave signals by the trigger circuit 8. The modified signals from the sensor 1, as converted by the trigger 8, are shown in graph b of FIG. 3, to form signal 3*b*. The trailing flank of the square-wave signal causes the monostable FF 9 to be SET. The monostable FF 9 provides a square-wave output signal, the duration of which is determined by the voltage at the control terminal 9*a*. The OR-gate 13 combines the output signals from the Schmitt trigger 8 and of the monostable FF 9 to form the output signal 3*d*. The duration of the output signal derived from the monostable FF 9 depends on the temperature of the sensor 1. To provide this temperature dependence, the sensor is supplied with alternating current from a-c source 6, passed by capacitor 5. Capacitor 5 blocks the d-c voltages or the very low-frequency voltage jumps by the sensor. Thus, d-c loading on the oxygen sensor 1 is effectively prevented. The a-c resistance of the sensor will change in dependence on the temperature, so that the sensor 1 can provide a temperature-dependent a-c voltage which is applied over the high-pass filter 10, amplified in amplifier 11 and rectified in rectifier 12 to control the delay or unstable time of the monostable FF 9.

If the temperature of the sensor 1 is low, the voltage jump of the sensor will occur at a value at which $\lambda$ is well above 1 or unity; if the air-fuel control of an IC engine would be controlled thereby, the working range would be shifted in the direction "lean". By the addition of an additional pulse, however, or rather by extending the pulse derived from the sensor, the shift is dynamically compensated within the control system so that the output will have an extended signal with respect to the original signal which, as far as a control system connected to the OR-gate 19 is concerned, means that the pulse is extended with respect to that originally derived from the sensor; the central or average value of the voltage jumps can be placed accurately at a value of $\lambda=1$.

The output of the OR-gate may, for example, have an integrator connected thereto of an exhaust gas control system based on exhaust gas composition, as described for example in the aforementioned WESSEL U.S. Pat. No. 3,875,907. The circuit in accordance with the present invention is particularly suitable for operation in temperature ranges between 200° C. and 500° C. The pulse derived from the monostable FF 9 is longest at the lower temperature, for example in the range of about 200° C. As the temperature increases, the length of the extending pulse changes and will reach a minimum at a temperature of about 500° C. The pulse derived from the monostable FF 9 is shown in graph c of FIG. 3, and applied from the monostable FF 9 to the OR-gate. The double-sided arrows in graph c of FIG. 3 schematically indicate the shift of the pulse length, for longer or shorter delay, in dependence on the voltage at the control input 9*a*.

The control function of the sensor can thus also be used at low temperature, since the "lean" position of the characteristic curves of the sensors can be compensated by use of a pulse extending monostable FF, based on the temperature of the sensor itself. It is particulariy advantageous that the temperature of the sensor itself can be derived by means of the very same connecting line, for example an already existent and wired cable to the sensor, merely by applying an additional a-c voltage of high frequency, without in any way influencing the low frequency exhaust gas control signal derived from the sensor itself. The frequency of the a-c source 6 is not critical; as explained in the aforementioned application DIETZ et al., Ser. No. 357,803, suitable frequencies are preferably above 1 kHz, and frequencies in the order of about 5 kHz have been found suitable.

The control unit C, for example as described in the aforementioned WESSEL et al. U.S. Pat. 3,875,907, is connected to provide an output signal suitable for control of a fuel-air ratio controller FAC, for example by relatively adjusting the flow rate of air through a carburetor, or the fuel being supplied at a given air flow rate, by controlling, for example, a bypass; or by controlling the amount of fuel being supplied for a given amount of air in a fuel injection system or, for example, in a fuel injection system or, for example, in a furnace system, by controlling the through-put of an air fan or air compressor and/or fuel supply to a burner.

The arrangement described provides for temperature compensation at low temperature only, that is, when the characteristic curves illustrated in FIG. 1 are shifted in the "lean" direction, by dynamically correcting the shift of the curve towards "rich". As the temperature of operation of the sensor rises, the voltage jump of the characteristics is shifted automatically towards "rich" and, at very high temperatures, will fall within the "rich" region, that is, in a range of $\lambda=<1$ or unity. FIG. 4 illustrates an arrangement in which high temperature shift of the characteristic curve can also be obtained by shifting the effective output signal towards the right so that, starting from a predetermined temperature, the curve will be shifted towards the "lean" direction.

Embodiment of FIG. 4: The sensor 1 is represented, again, by its equivalent circuit of a d-c source 2 and an internal resistance 3. It is supplied with alternating current from a generator 6 through capacitor 5 and resistor 4, the sensor output signal being available at junction J. The system, in that respect, is identical to that of FIG. 2.

Figure 5:
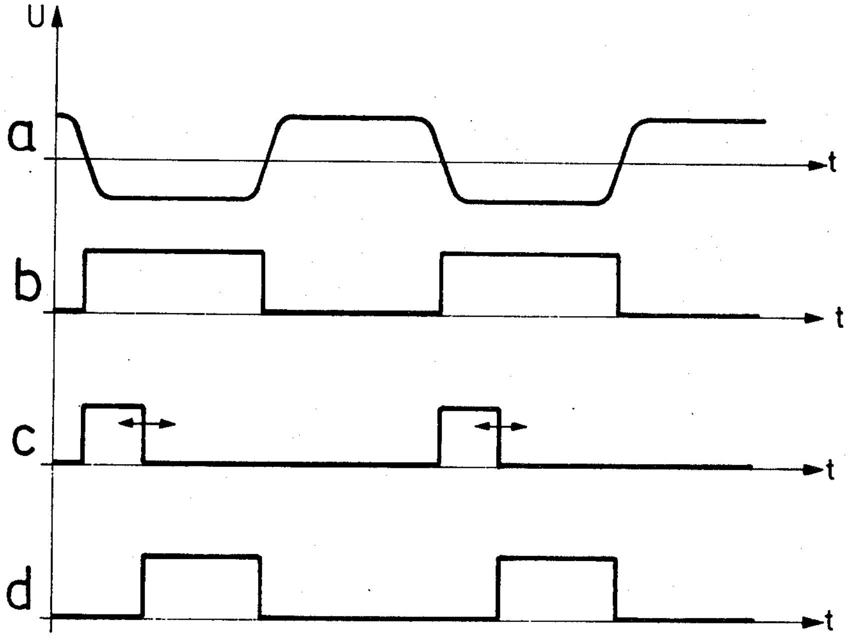
FIG. 5 is a pulse diagram having graphs a-d on a common time axis of some of the signals arising in the circuit of FIG. 4.

At junction J, a signal is derived as illustrated in FIG. 5, graph a, the signal being referred to in FIG. 4 as 5*a* which is applied to low-pass filter 7. The output of low-pass filter 7 is connected to a Schmitt trigger 8, as in FIG. 2, which, in turn, is connected to monostable FF 9. The output from the Schmitt trigger 8 is, additionally, connected to a further monostable FF 14.

Junction J from the sensor 1 is additionally connected to a high-pass filter 10, the output of which is connected through an amplifier (not shown) to a rectifier 12. Connecting an amplifier between the high-pass filter and the rectifier increases the sensitivity of the system. The output of the rectifier 12 is connected to the control input 9*a* of the monostable FF 9. The output of the Schmitt trigger 8 is connected to one input of an OR-gate 16 and to an AND-gate 17. The inverse output of the monostable flip-flop 14 is connected to the other input of the AND-gate 17, or, as shown, the direct output from monostable FF 14 to an inverting input of the AND-gate 17. The output of OR-gate 16 is connected to one input of an AND-gate 19; the output of the AND-gate 17 is connected to one input of an AND-gate 21. The output from rectifier 12 is connected to one input of a comparator 18, the other input to which is connected to a reference or comparison voltage source. The output of comparator 18 is connected to a further input of the AND-gate 19 and through an inverter 20 with a further input of AND-gate 21. The outputs of the two AND-gates 19 and 21 are connected to an input of an OR-gate 22. The output of the OR-gate 22 provides the control signal for the control unit C.

Operation, with reference to FIG. 5: Temperature is measured, as in the embodiment of FIG. 2, by determining the a-c resistance of the sensor 1. At low temperatures, that is, when the λ characteristic curve of the sensor is shifted towards "lean", the output signal of the Schmitt trigger is extended by extending the trailing flank of the signal by suitable control of the monostable FF 9. The two output signals from the Schmitt trigger 8 and the monostable FF 9 are combined in the OR-gate 16 which corresponds to OR-gate 13 of FIG. 2.

Comparator 18 provides a logic 1-signal if a voltage applied to its control input 18*a* is below the voltage of a reference value applied to its reference input 18*b*. At low temperatures, the output from comparator 18 thus will be a 1-signal so that, at low temperatures, the signal from OR-gate 16 is passed through the AND-gate 19 for connection through the OR-gate 22 to the control unit C.

The AND-gate 19 will have a logic 1-signal thereon when the temperature signal from the rectifier 12 is low, that is, is below the reference at terminal 18*b*. Outputs from the OR-gate 16 are thus transferred to the OR-gate 22 and, under low temperature conditions, the circuit operates just like that described in connection with FIG. 2.

Let it be assumed that the temperature rises, and the characteristic curve shifts towards the "rich" region, that is, to a value of $\lambda < 1$ or unity. At a predetermined voltage, which corresponds to a predetermined temperature level, the comparator will provide a 0-signal at its output. AND-gate 19 will block; inverter 20, however, will invert the 0-signal and thus provide an enabling signal to AND-gate 21, so that the AND-gate 21 can now apply input signals thereto to the control unit C through the OR-gate 22. For this condition, the operation of the monostable FF 14 becomes important. Monostable FF 14 is triggered by the rising flank of the signal from Schmitt trigger 8.

The output signal from the sensor 1, after having passed through the low-pass filter 7, that is, signal 5*a*, is illustrated in graph a of FIG. 5. The output of the Schmitt trigger 8, 5*b*, is shown in graph b of FIG. 5.

The monostable FF 14 is started with the rising flank of the Schmitt trigger 8 and provides an output signal 5*c*. The time duration of the output signal 5*c*, that is, the timing of the monostable FF 14, is determined by the temperature which has been sensed, and derived as a temperature-dependent signal from rectifier 12. The inverter 15 provides inversion of the signal so that, at low temperatures, the output pulse from the monostable FF 14 will be short, and will rise with increasing temperature. The AND-gate 17 then provides a pulse as seen in FIG. 5*d*, due to the inversion of the signal derived from the monostable FF 14, by connecting either to the complementary output, or through an inverting input of the AND-gate 17. The output signal from the AND-gate 17, after passing through AND-gate 21, which enabled due to the inverter 20, is available at the output of the OR-gate 22. The output signal thus is foreshortened so that a control unit C, using an integrator, will cause the integrator, for example of a fuel injection control system, to shift the "rich"/"lean" jump for a longer time in the direction "lean". Thus, by dynamic shift, in the "lean" direction, the exhaust gas also will become leaner so that the characteristic curve of the control system will be positioned accurately on the value corresponding to $\lambda = 1$. Thus, optimum exhaust gas conditions from the combustion process, for example the exhaust gases from an automotive vehicle, is insured. The position of the characteristic curve to which the sensor responds at a range in which the exhaust gases are too rich is thus compensated, and control of the fuel-air ratio supplied to the combustion process which would lead to such an excessively rich exhaust gas is likewise compensated.

Suitable reference voltage values for the reference terminal 18*b* are values corresponding to a temperature of the sensor of between about 300° C. to 400° C. Below this temperature, the signal of the oxygen sensor 1 is extended by the monostable FF 9 so that the lean/rich jump is made longer; above that temperature, the signal upon the rich/lean jump is delayed by the monostable FF 14.

The monostable FFs 9 and 14 are to be so controlled and adjusted that their time constants are zero at the temperature threshold at which the comparator 18 switches over, in order to provide gradual and continuous transition from one monostable FF to the other.

The system can also be used for artificially or deliberately changing the air-fuel ratio of air and fuel being supplied to a combustion process, for example to an IC engine. Thus, a pulse extension or an addititive addition of a pulse, corresponding to a delayed conduction of the lean/rich jump of the sensor, can be applied, for example in order to change the exhaust gases from an IC engine or from a furnace or heating installation towards a richer supply; this permits supervisory control of a control system or unit upon operation of the sensor in a lower temperature range or, alternatively, enriching the fuel-air mixture being supplied to the combustion system, for example an IC engine, in order to obtain predetermined desired operating conditions. The temperature reference level at the comparator 18*b* can be so set that the pulses supplied from the Schmitt trigger to the control system are, effectively, delayed, which corresponds to a delayed conduction of the rich/lean jump of the sensor, and thereby provide for leaner exhaust gases. Thus, dependent on the requirements of the control unit C, or other control system connected to the output from the sensor system, a dynamic matching of the leanness or richness of the fuel-air supply to the combustion system, an IC engine or a heating or furnace installation, for example, can be obtained in dependence on temperature, or to compensate individual operating characteristics of sensors, or to obtain otherwise desirable conditions. The system is so arranged that both monostable FFs 9, 14 will not be active; a switching logic with a selected temperature threshold permits only one of the monostable FFs, 9 or 14, to provide output signals which are capable of being switched through the OR-gate 22 to a control system. Thus, no additional additive dead-time intervals will arise, which would detract from rapid control operation and impair the control speed and characteristics of an existing control loop.

The arrangements are particularly suitable for controlling the composition of exhaust gases in internal combustion engines, or in furnace or heating installations. As well known, a rich mixture in the exhaust gas means that the value of λ in the exhaust gases is less than 1 or unity, whereas a lean mixture is signified by a λ value of greater than 1 or unity.

The specification describes the system with analog-type elements; of course, the system can also operate digitally, for example by providing the time delays of the respective pulses in accordance with counted numbers, in which the multistable flip-flops 9, 14 would be replaced by counters operating in accordance with a predetermined clock rate, the count number to which the counters count being determined by a count number input in dependence on the temperature signal, similar to the signal input *9a*, for example. The modification of the system to operate digitally is well known in electronic circuit technology.

Various changes and modifications may be made within the scope of the inventive concept.

We claim:

1. System for determination of the oxygen content in gases, especially the exhaust gases from a combustion process, and particularly from an internal combustion engine, having an oxygen sensor (1) furnishing a sensed output signal varying between two values in dependence on oxygen content of the gas, and wherein the change in value, with respect to oxygen content, is dependent on operating temperature of the sensor, comprising threshold means (8) responding to the level of the sensed output signal of the sensor and providing discrete output signals (**3*b*, 5*b***) representative of the sensed output signal;

temperature signal generating means (4, 5, 6, 10, 11, 12) providing a temperature output signal representative of temperature of the sensor;

at least one controllable timing stage (9, 14) connected to receive the discrete output signals from said threshold means (8) and having a variable time constant, said timing stage being further connected to and controlled by said temperature signal of the temperature signal generating means, for varying the time constant thereof in dependence on the temperature of the sensor;

and means (13; 16, 19, 22) for providing a modified output signal (**3*d*), coupled to said timing means, comprising combining means (13, 16; 17) combining an output signal (3*c*, 5*c*) from the timing stage (9, 14) with the discrete output signals (3*b*, 5*b*) to provide said modified output signal (3*d*, 5*d***).

2. System according to claim 1, wherein said at least one timing stage (9) comprises a timing element or circuit (9) extending the pulse duration of pulses having a first polarity and received from said threshold means (8).

3. System according to claim 1, wherein the sensor provides output pulses having a first polarity upon sensing a change of composition of gases from a lean to rich composition;

and the timing stage provides for extension pulses to said modified output signal deriving means to delay the shift of the pulses derived from the sensor upon change of gas composition from "lean" to "rich".

4. System according to claim 2, wherein a second timing stage (14) is provided, said second timing stage shortening the pulse derived from the threshold means (8) to delay pulses supplied by said modified output signal deriving means representative of change in output signal from the sensor upon change of composition of the gas from rich to lean gas composition.

5. System according to claim 4, further including an evaluation logic (17, 19, 20, 21, 22);

and temperature setting means (**18, 18*b*) controlling the evaluation logic to connect to said means for deriving the modified output signal to the signals derived from either a first timing stage (9) or the additional timing stage (14**).

6. System according to claim 4, wherein the timing stages are monostable multivibrators (9, 14).

7. System according to claim 1, wherein the temperature signal generating means comprises an a-c generator (6);

means (4, 5) coupling alternating output from the a-c generator (6) to the sensor;

and means (10, 11, 12) connected to said sensor and responsive to the alternating current resistance thereof to derive said temperature output signal for connection to and control of the at least one timing stage (9, 14).

8. System according to claim 7, wherein the a-c resistance responsive means includes a high-pass filter (10);

and a low-pass filter (7) is connected between the sensor (1) and said threshold means (8) to separate the a-c signal representative of temperature of the sensor and the d-c output signals from the sensor varying between two values.

9. System according to claim 8, wherein the a-c resistance responsive means includes a rectifier (12), the output of the rectifier being connected to and controlling the at least one timing stage (9, 14) to control the time constants thereof.

10. System according to claim 4, wherein one of the timing stages (9) comprises a monostable flip-flop (9), triggered or set by the trailing flank of the signal derived from the threshold means;

the additional timing stage (14) comprises a monostable flip-flop (14) triggered or set by the oppositely going flank from the threshold means (8);

a comparator (18) is provided furnishing preset output signals having characteristics in dependence on whether said temperature signal is above or below a predetermined level;

and logic means (19, 21) controlled by said comparator (18) passing the output signals from said timing stages, selectively, in dependence on the level of said temperature signal with respect to the present temperature level and the discrete output signal from the threshold means to form, in part, said means for deriving a modified output signal, to provide an output signal from the sensor which is delayed either upon change of the gas from lean to rich at one temperature range, or to delay the sensor signal upon change from rich to lean in another temperature operating range of the sensor.

11. System according to claim 1, wherein the temperature signal generating means includes an alternating current generator providing alternating current signals of about at least 1 kHz, and a capacitor (5) coupling said signals to the sensor (1).

12. Method of determining the oxygen content in gases, especially the exhaust gas from a combustion process, and particularly from an internal combustion engine, in which an oxygen sensor (1) is provided, exposed to the exhaust gases, and furnishing a sensed output signal varying between two values in dependence on the oxygen content in the gas, and wherein the change in output signal value, with respect to oxygen content, is dependent on operating temperature of the sensor, comprising the steps of deriving a temperature signal representative of temperature of the sensor;

deriving discrete output pulses (3*b*, 5*b*) representative of the sensed output signal;

and modifying the length of the pulses in dependence on the sensed temperature.

13. Method according to claim 12, wherein said modifying step comprises extending the pulses when the sensed temperature is below a predetermined level.

14. Method according to claim 12, wherein the modifying step comprises foreshortening or compressing the length of said pulses when said temperature is above a predetermined temperature level.

15. Method according to claim 13 or 14, including the step of generating a signal representative of said temperature level;

and modifying said generated signal to simulate change in temperature level and hence modify the length of said pulses.

16. Method according to claim 14, wherein said step of foreshortening the length of the pulses comprises delaying transmission of the leading edge of said pulses without modifying the trailing edge thereof.

17. Method according to claim 13, wherein said step of extending the length of the pulses comprises delaying the occurrence of the trailing edge of said pulses without modifying the occurrence of the leading edge thereof.

18. System for determination of the oxygen content in gases, especially the exhaust gases from a combustion process, and particularly from an internal combustion engine, having an oxygen sensor (1) furnishing a sensed output signal varying between two values in dependence on oxygen content of the gas, and wherein the change in value, with respect to oxygen content, is dependent on operating temperature of the sensor, comprising threshold means (8) responding to the level of the sensed output signal of the sensor and providing discrete output signals (3*b*, 5*b*) representative of the sensed output signal;

temperature signal generating means (4, 5, 6, 10, 11, 12) providing a temperature output signal representative of temperature of the sensor;

at least one controllable timing stage (9, 14) connected to receive the discrete output signals from said threshold means (8) and having a variable time constant, said timing stage being further connected to and controlled by said temperature signal of the temperature signal generating means, for varying the time constant thereof in dependence on the temperature of the sensor;

and means (13; 16, 19, 22) connected to receive an output from said least one controllable timing stage for providing a modified output signal;

wherein the sensor provides output pulses having a first polarity upon sensing a change of composition of gases from a lean to rich composition;

and the timing stage provides for extension of pulses to said modified output signal deriving means to delay the shift of the pulses derived from the sensor upon change of gas composition from "lean" to "rich".

19. System according to claim 18, wherein a second timing stage (14) is provided, said second timing stage shortening the pulse derived from the threshold means (8) to delay pulses supplied by said modified output signal deriving means representative of change in output signal from the sensor upon change of composition of the gas from rich to lean gas composition.

20. System according to claim 18, wherein the temperature signal generating means comprises an a-c generator (6);

means (4, 5) coupling alternating output from the a-c generator (6) to the sensor;

and means (10, 11, 12) connected to said sensor and responsive to the alternating current resistance thereof to derive said temperature output signal for connection to and control of the at least one timing stage (9, 14).

* * * * *